United States Patent [19]

Vassallo et al.

[11] Patent Number: 4,579,354
[45] Date of Patent: Apr. 1, 1986

[54] GASKET

[75] Inventors: Efrain D. Vassallo; Jose E. Valls, both of Ponce, P.R.

[73] Assignee: Vassallo Research and Development Corporation, Ponce, P.R.

[21] Appl. No.: 678,494

[22] Filed: Dec. 5, 1984

[51] Int. Cl.⁴ .............................................. F16J 15/32
[52] U.S. Cl. ........................... 277/207 A; 277/DIG. 2
[58] Field of Search ............. 217/207 A, DIG. 2, 205

[56] References Cited

U.S. PATENT DOCUMENTS

| | | | |
|---|---|---|---|
| 2,966,539 | 12/1960 | Sears et al. | 277/207 A |
| 2,980,449 | 4/1961 | Dunton | 277/207 A |
| 3,081,102 | 3/1963 | Murray et al. | |
| 4,343,480 | 8/1982 | Vassallo | |
| 4,474,392 | 10/1984 | Vassallo et al. | |

FOREIGN PATENT DOCUMENTS 1033756  6/1966  United Kingdom .

OTHER PUBLICATIONS

Six page catalog entitled "Peerless PVC Plastic Pipe".
Four page brochure entitled "The Ultimate Gasket System".
Four page brochure entitled "V-Joint PVC Pressure & Class Water Pipe".
Eight page brochure entitled "Gask-O-Weld".

Primary Examiner—Robert I. Smith
Attorney, Agent, or Firm—Steele, Gould & Fried

[57] ABSTRACT

A resilient gasket is disclosed which includes an annulus of generally U-shaped cross sectional configuration having a circular, arched, radially outwardly positioned base, a first, thin, forward wall extending radially inwardly from the base, a second relatively thick, rearward wall extending radially inwardly from the base, the forward wall and the rearward wall defining a circular, radially inwardly open, retaining ring receiving groove therebetween, the width of the groove being greater than the combined thicknesses of the forward and the rearward walls. The forward wall and the rearward wall each terminate radially inwardly in a slanted, forwardly facing lip to facilitate sealing engagement with the spigot end of a section of pipe. The lip of the forward wall serves to center and to wipe the exterior periphery of the spigot end and the lip of the rearward wall serves to seal against the spigot end.

3 Claims, 4 Drawing Figures

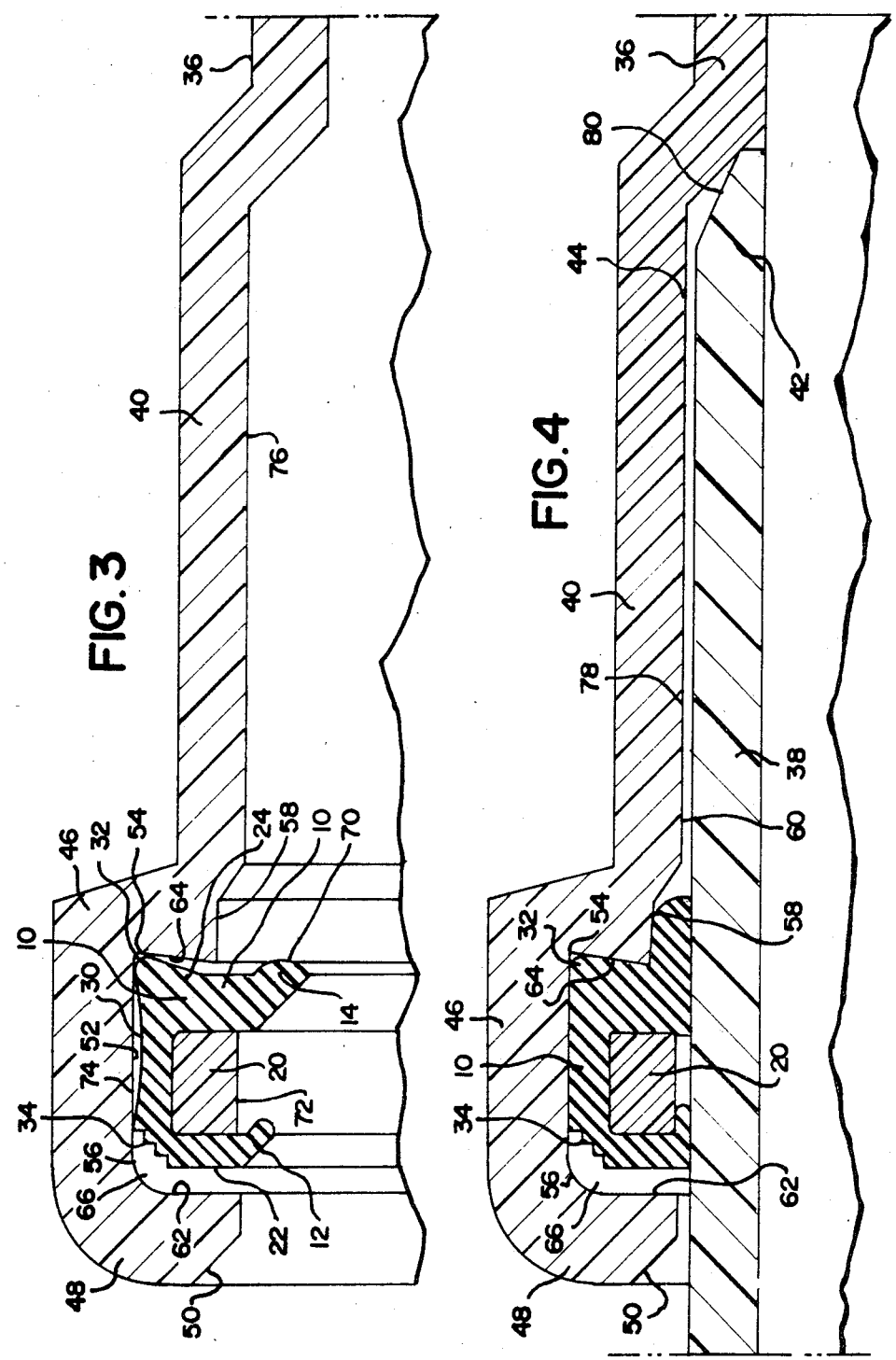

GASKET

BACKGROUND OF THE INVENTION

1. Field of the Invention

The present invention relates generally to sealing devices for pipe junctions, and more particularly, relates to a novel annular resilient gasket in combination with a non-resilient locking ring for use in forming a fluid-tight seal between the telescoping ends of interconnected members of a bell and spigot type joint.

2. Discussion of the Prior Art

It is known to employ plastic pipes and fittings in the design and construction of underground conduit systems for conveyance of water under pressure and drainage purposes. Individual sections of plastic pipe are joined together in end to end juxtaposition and suitable fittings are employed intermediate the pipe sections to construct changes in direction, branch connections and the like. A most common method employed in joining the pipe sections and fittings is the so-called bell and spigot joint wherein one end of a pipe or fitting is enlarged or "belled" to receive therein the unenlarged or "spigot" end of the adjacent length of pipe. The inside diameter of the belled section or hub is formed sufficiently large to receive therein the spigot end of the next adjacent section of pipe with sufficient annular clearance to provide for the application of packing, caulking, gaskets or other devices which are designed to prevent leakage at the pipe joints when the pipe sections and fittings are joined into a pipe line. Depending upon the intended pressure at which the fluid will be conveyed within the pipe system, other design parameters such as the wall thickness of the pipe and the type of material of the pipe, the type of seal between adjacent lengths of pipe, the configuration of the bell, etc., will require more or less sophisticated design considerations.

Particularly in the plastic pipe industry, it is the common practice to provide a rubber or other elastomeric material gasket to form the seal between adjacent pipe sections or at the junction between a pipe and a fitting. Such gaskets have been configured and designed to facilitate the making up of the pipe joint in the shortest possible period of time in a manner to prevent leakage at the joint upon completion of the system. As the design operating pressures in a piping system increase, the difficulties encountered in providing an efficient and reliable seal have also increased.

In efforts to solve the sealing problems at pipe joints which are inherent in pressure or vacuum piping systems, prior workers in the art have developed gaskets of the type including one or more radially inwardly extending lips to press against the spigot end of the connected section of pipe. Additionally, other workers have provided gaskets having an internal peripheral groove within which is seated a locking ring of relatively hard plastic material to prevent movement of the seal as the joint is made up and to discourage gasket blow out when surges in system pressure occurred. In other efforts to prevent unseating of the gasket when the pipe joint was made up or to aid in preventing gasket blow out under severe pressure conditions of use, prior workers have also developed means to lock the gasket within an annular groove which could be formed in the plastic material of the bell during the belling operation.

In U.S. Pat. No. 4,343,480, entitled "Pipe Bell and Gasket", which patent is owned by the assignee of the present application, there is disclosed a bell and spigot connection for plastic pipes which employs a gasket groove in the hub and a gasket having a pair of longitudinally spaced, radially inwardly extending lips which is seated within the gasket groove. The gasket may be employed either with or without a hard plastic retaining ring intermediate the lips. In the patented configuration, the exterior or entrance end of the hub was radially inwardly bent after the gasket was seated in the hub groove to retain the gasket within the gasket receiving groove in a manner to prevent gasket blow out upon surges in system pressure.

Other patents wherein gaskets with radially inwardly projecting lips are disclosed, among others, are U.S. Pat. Nos. 2,980,443, 3,081,102 and 4,379,559.

All of the prior art gaskets of which we are aware were formed of relatively thick sections of rubber or other elastomeric material and this thickness was required to prevent tearing of the gasket upon making up of the joint and to discourage gasket blow out at operating pressures. Due to the thickness of the gasket material that has been required to produce a satisfactory product, the presently available gasket sealing means tend to be quite expensive in manufacture and therefore significantly increase the overall costs of the pipes and fittings which comprise a piping system.

SUMMARY OF THE INVENTION

The present invention relates generally to the field of gaskets for sealing the joints in plastic piping systems, and more particularly, is directed to an improved gasket construction which is formed with relatively thin side walls in a manner to decrease fabrication costs without any corresponding decrease in utility or quality.

The gasket of the present invention is annularly formed to a generally U-shaped cross sectional configuration wherein an annular, radially inwardly open groove is defined to receive therein a retaining ring of relatively hard plastic material, for example, a ring of molded polypropylene plastic. The gasket comprises a circular arched base, a front wall and a rearward wall of thicker material. The front wall radially inwardly defines a leading lip of suitable inner diameter which can be employed to center and to initially wipe the outer periphery of the spigot end of the adjacent pipe section as the bell and spigot joint is being made. The thicker rear wall of the gasket terminates radially inwardly in a sealing lip of inner diameter which is designed to press against and seal against the outer periphery of the spigot end of the adjacent pipe section to provide a leak-tight, easily made up junction.

The hard plastic ring is fabricated of a width that is larger than heretofore used in the pipe joining art and is utilized to prevent unseating of the gasket when the parts are joined together and to discourage gasket blow out after the system is pressurized and in use. It is noteworthy that the width of the sealing ring is designed to be greater than the combined width of the forward gasket wall and the rearward gasket wall, thereby resulting in considerable cost savings inasmuch as the hard plastic of the ring is much less costly than the rubber of the gasket.

The gasket has been particularly designed and configured to secure within a specially configured groove formed in the hub wherein the groove is defined between a sharp, angular, longitudinally rearwardly positioned, circular corner and a bent, longitudinally forwardly positioned forward terminus. The gasket is formed with a rounded, rearward, circular corner of configuration to securely seat within the sharp circular corner of the gasket groove to thereby provide an extremely sturdy construction to prevent longitudinal rearward movement or tearing of the gasket when the junction is being made up. An annular socket or recess is formed in the inner wall of the hub immediately rearwardly adjacent to the sharp corner 54 to provide a recessed, annular seat for the sealing lip of the gasket when the lip is bent upon entrance of a spigot end, thereby providing a firm backing during the subsequent joint sealing engagement.

The leading, radially outer corner of the gasket is corbelled or otherwise roughened to follow the bend radius of the forward bend of the hub and to provide a frictional gripping effect between the gasket and the fitting to thereby provide a construction designed to additionally discourage gasket blow out in the event of abnormal pressure surges within the system.

It is therefore an object of the present invention to provide an improved gasket construction of the type set forth.

It is another object of the present invention to provide a novel gasket construction incorporating an annular resilient gasket of generally U-shaped cross sectional configuration comprising a circular base, a leading lip and a trailing lip projecting radially inwardly from the gasket base, the lips defining a groove therebetween, a hard plastic ring being insertable within the gasket groove wherein the width of the plastic ring is greater than the combined width of the leading lip and the trailing lip of the gasket.

Is is another object of the present invention to provide a novel gasket comprising an annular base, a leading lip extending radially from the base to wipe the peripheral surface of the spigot end of an adjacent section of pipe, a trailing lip extending radially from the base to seal against the spigot end of the adjacent section of pipe, the gasket base comprising a rounded trailing corner and a corbelled leading corner whereby the gasket may be firmly seated within a configured groove formed in the hub end of a plastic pipe or fitting.

It is another object of the present invention to provide a novel gasket construction comprising an annular gasket of generally U-shaped configuration, the gasket comprising circular, arched, radially outwardly positioned base, a thin leading lip extending radially inwardly from the base, a relatively thick trailing lip extending radially inwardly from the base, the base being defined by a rounded rearward seating corner of relatively small radius and a corbelled forward corner, the leading lip terminating inwardly in an angular, forwardly inclined surface, the angular surface terminating axially rearwardly in a rounded projection, the trailing lip terminating radially inwardly in an angular forwardly inclined surface, the angular surface terminating axially rearwardly in a rearwardly facing rounded nose to secure the ring within the gasket construction and to prevent tearing or gasket blow out when in use.

It is another object of the present invention to provide a novel gasket construction which comprises an annulus of resilient material, the annulus being radially outwardly defined by a longitudinally arched base, the base terminating forwardly in a corbelled frictional surface and rearwardly in a rounded seating corner, the gasket being generally U-shaped in cross sectional configuration and including a relatively thin forward wall and a relatively thick rearward wall, the forward and rearward walls defining a gasket receiving circular groove therebetween, the width of the groove being greater than the combined thickness of the forward wall and the rearward wall, the forward wall terminating radially inwardly in a circular, angular lip, the lip including a rearwardly rounded projection, the rearward wall terminating radially inwardly in an angular surface, the angular surface of the rearward wall projecting radially inwardly further than the angular surface of the forward wall, the angular surface of the rearward wall terminating rearwardly in a rounded, rearwardly facing nose.

It is another object of the present invention to provide a novel gasket for sealing the junction between the hub of a pipe or fitting and the spigot end of a pipe that is inexpensive in manufacture, rugged in construction and leakproof when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 3 is an enlarged, partial, cross sectional view showing the gasket and ring of FIG. 1 seated within a groove formed in the hub of a plastic pipe or fitting.

FIG. 4 is a partial, cross sectional view similar to FIG. 3 showing the spigot end of an adjacent length of pipe in sealing engagement within the hub of the pipe or fitting.

DESCRIPTION OF THE PREFERRED EMBODIMENT OF THE INVENTION

Figure 1:
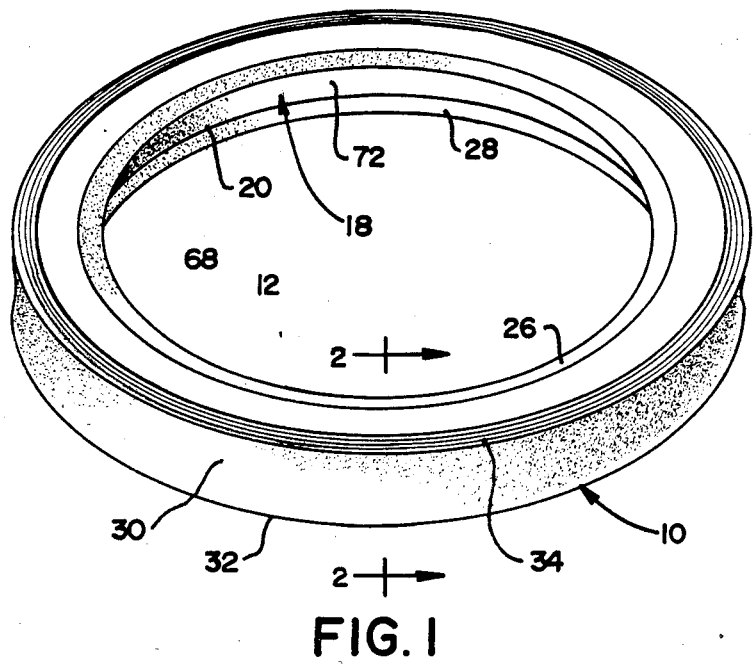
FIG. 1 is a perspective view of a gasket and retaining ring constructed in accordance with the teachings of the present invention.

Although specific terms are used in the following description for the sake of clarity, these terms are intended to refer only to the particular structure of the invention selected for illustration in the drawings, and are not intended to define or limit the scope of the invention.

Figure 2:
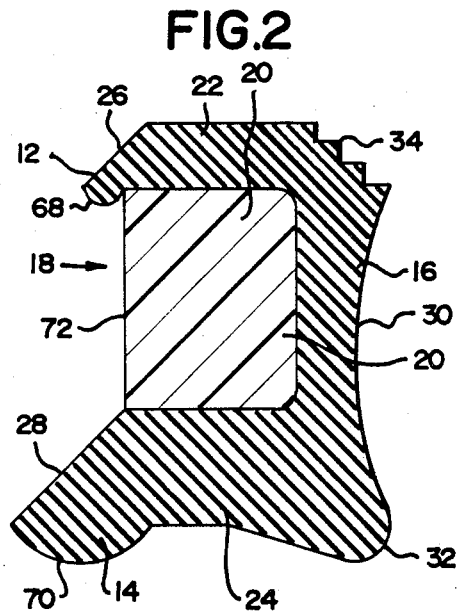
FIG. 2 is an enlarged, cross sectional view taken along line 2—2 on FIG. 1, looking in the direction of the arrows.

Referring now to the drawings, there is shown in FIGS. 1 and 2 a gasket 10 having a generally U-shaped cross sectional configuration and including a base 16, an integral forward wall 22 and an integral, rearwardly spaced, rearward wall 24. The forward and rearward walls 22, 24 define a circular groove therebetween to receive therein a retaining ring 20, as hereinafter more fully set forth. In known manner, the gasket should be molded or otherwise formed of a resilient or elastomeric material, preferably rubber. The retaining ring 20 is preferably fabricated of a relatively non-resilient, hard, strong plastic material, such as polypropylene plastic.

As best seen in FIG. 2, the gasket forward wall 22 is fabricated of smaller cross sectional thickness than the thickness of the rearward wall 24 and in the preferred embodiment, the width or thickness of the forward wall 22 is less than one-half the width or thickness of the rear wall 24. It is noteworthy that the width of the retaining ring groove 18 is designed to be greater than the combined thickness of the forward wall 22 and the rearward wall 24. The stated dimensional relationships result in use of less rubber in the gasket 10 than heretofore possible with prior art gasket constructions and inasmuch as the cost of polypropylene plastic is considerably less than the cost of rubber, the reduction in the quantity of rubber required in the gasket construction results in considerable material cost savings. The thickness of the rearward wall 24 has been carefully designed to provide adequate body and strength to prevent tearing when the joint is being made up. As an example of an acceptable gasket design, in a four inch nominal size, a forward wall thickness of 0.060 inches, a rearward wall thickness of 0.140 inches and a groove width of 0.280 inches has been successfully tested.

Still referring to FIG. 2, the forward wall 22 of the gasket 10 terminates radially inwardly in a circular leading lip 12 and radially outwardly in a corbelled or roughened outer corner 34. The leading lip 12 comprises a forwardly facing angular surface 26 which is designed to wipe over and initially clean the outer periphery of the spigot end 42 (FIG. 4) of an adjacent section of pipe 38 to be joined. The angularly inclined surface 26 of the forward wall 22 terminates radially inwardly in an axially rearwardly extending, rounded projection 68, which projection is positioned radially inwardly from the interior periphery surface 72 of the retaining ring 20. The rounded projection 68 is readily axially rearwardly bent upon entrance of the spigot end 42 of the second pipe 38 within the hub end 40 of the first pipe 36 and partially overfits and covers the retaining ring interior surface 72. This functions to lock the ring within the circular groove 18 when the joint is made up and to prevent twisting or other distortion.

The rearward wall 24 of the gasket 10 terminates radially inwardly in a sealing lip 14. The sealing or trailing lip 14 comprises a forwardly facing, circular inclined surface 28, which surface is designed to bear against and slide upon the outer periphery of the spigot end 42 of the connected second pipe 38 as the pipe joint is being made up. The rearward wall 24 extends further radially inwardly than the forward wall 22 and provides the main sealing function when the parts are assembled. The sealing lip 14 of the rearward wall 24 terminates radially inwardly and rearwardly in a rounded nose 70 to provide additional thickness of gasket material which aids in the joint sealing function as hereinafter more fully set forth. The rearward wall 24 integrally joins the base 16 and defines a small radius rounded or blunt circular seating corner 32 therewith for securing the gasket in place within the enlarged groove 46 of the hub when in use. It will be noted that the outer periphery of the base 16 is longitudinally, circularly arched from the seating corner 32 to the corbelled corner 34 to aid in the sealing process. The arch 30 functions to continuously circularly bias portions of the gasket 10 against the outer periphery of the spigot end 42 of the second pipe 38 to enhance the sealing capabilities of the gasket.

Referring now to FIGS. 3 and 4, a first pipe 36 is molded or otherwise conventionally treated to provide an enlarged bell or hub 40 with an enlarged diameter diameter portion 46 to define an annular gasket groove 66 within which the gasket 10 can be conveniently seated. The enlarged area 46 is configured to define a circular, forward, bent corner 56 and an axially interior, circular, rearward sharp angular corner 54. The sharp angular corner 54 is defined by the annular radially inner surface 52 of the enlarged area 46 and the forward surface of the rear wall 64 of the enlarged area 46. The interior surface of the enlarged area front wall 62 radially extends inwardly from the bent corner 56 and is normally formed after the gasket 10 has been positioned within the gasket groove 66 in a manner to lock the gasket within the groove so as to prevent gasket blow out upon excess pressure or surges within the system pressure.

As best seen in FIG. 3, the small radius rounded seating corner 32 of the gasket is circularly seated into the sharp angular corner 54 of the enlarged area 46 in a manner to prevent further axial rearward movement of the gasket 10 relative to the hub end 40. Thus the circular corner 54 serves as a positive axially rearward stop for the gasket. The corbelled forward corner 34 of the gasket 10 is positioned adjacent to the bent corner 56 of the enlarged hub area 46 and provides a gripping effect or frictional engagement of the gasket within the groove 56 so as to make it more difficult for the gasket to blow out in the event of an abnormal pressure rise within the piping system. The gasket outer peripheral arch 30 positions adjacent to the annular inner surface 52 of the enlarged hub area 46 and when unstressed, defines an annular arcuate air pocket or clearance space 74 therebetween. The clearance space 74 is compressed by the entrance of the spigot end 42 (FIG. 4) and when so compressed, continuously biases radially, circularly inwardly to apply additional sealing forces against the spigot end 42.

Referring now particularly to FIG. 4, the spigot end 42 of a second pipe 38 is illustrated in sealing engagement within the hub 40 of the first pipe 36. The leading and trailing lips 12, 14 of the gasket 12 bias against the outer periphery of the spigot end 42 to provide a seal thereagainst. A small annular clearance space 44 is defined between the outer periphery of the spigot end 42 and the inner periphery of the hub end 40 in the usual manner. It is noteworthy that the rounded projection 68 of the leading lip 12 is deformed upon entrance of the spigot end 42 and is deflected or bent rearwardly to a final sealing position that partially covers a forward portion of the inner periphery of the plastic retaining ring 20. This serves to additionally secure the ring and gasket in the desired position and discourages relative movement therebetween.

Similarly, the rounded nose 70 of the trailing lip 14 is also rearwardly deflected or bent by the insertion of the spigot end 42 of the second pipe into the hub end 40 of the first pipe or fitting and is radially outwardly squeezed or pressed into the annular socket 58 which is formed in the inner periphery 76 of the hub 40 immediately axially rearwardly of the gasket groove rear wall 64. As illustrated, the sealing or trailing lip 14 is compressed within the annular socket 58 in a manner to aid in continuously biasing against and sealing against the outer periphery 78 of the spigot end 42. The combination of the retaining ring 20, the seating of the gasket corner 32 within the angular sharp corner 54 of the hub groove and the overfitting of the leading lip rounded projection 68 over the interior periphery 72 of the retaining ring 20 all cooperate to securely position the gasket 10 within the gasket groove 66 in a manner to prevent tearing, deformation or other unwanted movement which might interfere with the seal between the bell 40 of one pipe or fitting and spigot 42 of another pipe when the joint is made up. In known manner, to facilitate the entry of the spigot 42 within the hub end 40, the leading end of the spigot 42 may be provided with an angular, circular surface 80 and the bent end 48 of the enlarged end of the hub 40 may be provided with an oppositely angular, circular front surface 50 in a manner to aid in guiding the spigot end 42 of the second pipe 48 into sealing engagement within the first pipe hub 40.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

We claim:

1. A resilient gasket for use in sealing the junction between a bell and a spigot in a plastic piping system comprising an annulus of generally U-shaped cross sectional configuration;

the annulus comprising a base, a thin forward wall and a thicker rearward wall, the forward and rearward walls integrally extending radially inwardly from the base, the base terminating axially rearwardly in a small radius, circular, seating corner and axially forwardly in a circular corbelled corner, the forward and rearward walls defining a radially inwardly open rectangular groove therebetween, the width of the rectangular groove being greater than the combined thicknesses of the forward and rearward walls, and a hard plastic retaining ring seated within the groove, the retaining ring being substantially rectangular in cross sectional configuration, the retaining ring having an outer peripheral surface in contact with the gasket base and an inner peripheral surface not in contact with the basket, the retaining ring having a width that is greater than the combined thicknesses of the gasket forward and rearward walls, the forward gasket wall terminating radially inwardly in an angled, circular leading lip, the leading lip comprising a rounded, rearwardly facing projection, the rearwardly facing projection radially partially covering a forward portion of the inner periphery of the retaining ring to discourage relative movement between the gasket and the ring.

2. The gasket of claim 1 wherein the rearward wall terminates radially inwardly in an angled trailing lip and wherein the trailing lip further comprises a rounded, rearwardly facing nose, the rearward wall being thickest at the nose to provide increased gasket material at the rearward wall radial inward terminus to enhance sealing the said junction.

3. The gasket of claim 2 wherein the thickness of the rearward wall is approximately equal to one-half the width of the groove.

* * * * *